(12) United States Patent  (10) Patent No.: US 9,285,477 B1
Smith et al.  (45) Date of Patent: Mar. 15, 2016

(54) 3D DEPTH POINT CLOUD FROM TIMING FLIGHT OF 2D SCANNED LIGHT BEAM PULSES

(71) Applicant: Apple Inc., Cupertino, CA (US)

(72) Inventors: Scott T. Smith, San Jose, CA (US); Matthew E. Last, Santa Clara, CA (US); Edward A. Valko, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/160,382

(22) Filed: Jan. 21, 2014

Related U.S. Application Data

(63) Continuation of application No. 14/158,582, filed on Jan. 17, 2014, now abandoned.

(60) Provisional application No. 61/756,848, filed on Jan. 25, 2013, provisional application No. 61/820,270, filed on May 7, 2013.

(51) Int. Cl.
 *G01S 17/89* (2006.01)

(52) U.S. Cl.
 CPC ...................... *G01S 17/89* (2013.01)

(58) Field of Classification Search
 CPC ....... G01C 23/005; G01C 3/08; G01S 7/4817
 USPC ............. 356/3.01–3.15, 4.01–4.1, 5.01–5.15, 356/6–22
 See application file for complete search history.

(56) References Cited

U.S. PATENT DOCUMENTS

| | | | |
|---|---|---|---|
| 7,215,430 B2 | 5/2007 | Kacyra et al. | |
| 7,248,342 B1 | 7/2007 | Degnan | |
| 7,969,558 B2 | 6/2011 | Hall | |
| 8,346,480 B2 | 1/2013 | Trepagnier et al. | |
| 2003/0043058 A1* | 3/2003 | Jamieson et al. | 340/961 |
| 2011/0216304 A1 | 9/2011 | Hall | |

* cited by examiner

*Primary Examiner* — Luke Ratcliffe
(74) *Attorney, Agent, or Firm* — Blakely, Sokoloff, Taylor & Zafman LLP

(57) ABSTRACT

A light detection and ranging (LIDAR) system has an emitter which produces a sequence of outgoing pulses of coherent collimated light that transmitted in a given direction, a mirror system having a scanning mirror that is positioned to deflect the outgoing pulse sequence towards a scene, and a detector collocated with the emitter and aimed to detect a sequence of incoming pulses being reflections of the outgoing pulses that are returning from said given direction and have been deflected by the scanning mirror. An electronic controller communicates with the emitter and the detector and controls the scanning mirror, so that the outgoing pulses scan the scene and the controller computes a radial distance or depth for each pair of outgoing and incoming pulses and uses the computed radial distance to provide a scanned 3D depth map of objects in the scene. Other embodiments are also described.

20 Claims, 3 Drawing Sheets

3D DEPTH POINT CLOUD FROM TIMING FLIGHT OF 2D SCANNED LIGHT BEAM PULSES

RELATED MATTERS

This application is a continuation of U.S. patent application Ser. No. 14/158,582, filed Jan. 17, 2014, entitled "3D Depth Point Cloud From Timing Flight of 2D Scanned Light Beam Pulses", currently pending, which is a non-provisional application that claims the benefit of the earlier filing date of provisional application no. 61/756,848 filed Jan. 25, 2013, and provisional application no. 61/820,270 filed May 7, 2013.

An embodiment of the invention relates to an optical remote sensing system that can automatically produce a 3-dimensional (3D) point cloud that represents the 3D coordinates of real world surfaces that are within a given space that can be sensed by the system. Other embodiments are also described.

BACKGROUND

There are applications in which a depth measurement is needed for each point or pixel in a 2-dimensional (2D) image of a scene, which provides information about the distance between an object in the scene and the image capturing system. There is existing technology that provides such depth information in the form of a 3D point cloud that represents the 3D coordinates of real world surfaces within a given space. For instance, in computer stereo vision, 3D information is extracted from 2D digital images obtained by a solid state digital camera, by comparing captured information about the scene from two vantage points, and by examining the relative positions of objects in the images taken from the two vantage points. Another technique is referred to as structured light in which a known pattern of pixels is projected onto the scene. The way these patterns deform when striking the real world surfaces allows a vision system to calculate the depth and surface information of the objects in the scene. Invisible or imperceptible structured light is a technique that uses infrared light. Yet another technique is a time of flight camera that computes the distance or depth value based on the known speed of light and based on measuring the time of flight of a light signal between the camera and the reflecting object, for each point of the resulting image. In a time of flight camera, the entire scene is captured with each laser or light pulse. This is in contrast to a scanning light detection and ranging (LIDAR) system in which a pulsed light sweeps across the scene. It has been found, however, that such techniques may suffer from one or more of the following: excessive power consumption, limited x-y resolution, limited depth resolution or accuracy, limited frame rate, and long product development cycles.

SUMMARY

An embodiment of the invention is an optical remote sensing system that can generate a digital, time-varying 3D point cloud that represents the 3D coordinates of the real world surfaces that are within a given field of view (FOV) and a given distance or depth. In one embodiment, the system can be described as a scanning LIDAR system. The system has an emitter that produces pulses of coherent collimated light beams (e.g., laser pulses), a mirror system, and a detector that is substantially co-located with the emitter to detect the pulsed light beams when they have been scattered or reflected by an object in the scene. The mirror system has a scanning mirror that is controlled so that outgoing or drive light pulses, that are deflected by it onto the scene, will cover or scan the entire horizontal and vertical FOVs in an x-y plane. The system computes its measurements of the radial distance or depth (in the "z" axis) for each drive pulse, based on having detected an associated incoming or return pulse, being the drive pulse that has been reflected from an object in the scene. The speed of light may be multiplied by the measured time interval between emission of the drive pulse and reception of the return or reflected pulse. The system associates each x-y position of a drive pulse with its measurement of the radial distance using the associated return pulse, to yield a data structure that may be a scanned "frame" or 3D depth map or point cloud that covers the entire FOV. The depth map or point cloud may then be used to create a model of the surfaces of the external real world objects that produced the reflections. This frame scanning process repeats continuously to produce a time-varying or live-action depth map having a suitably high frame rate.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
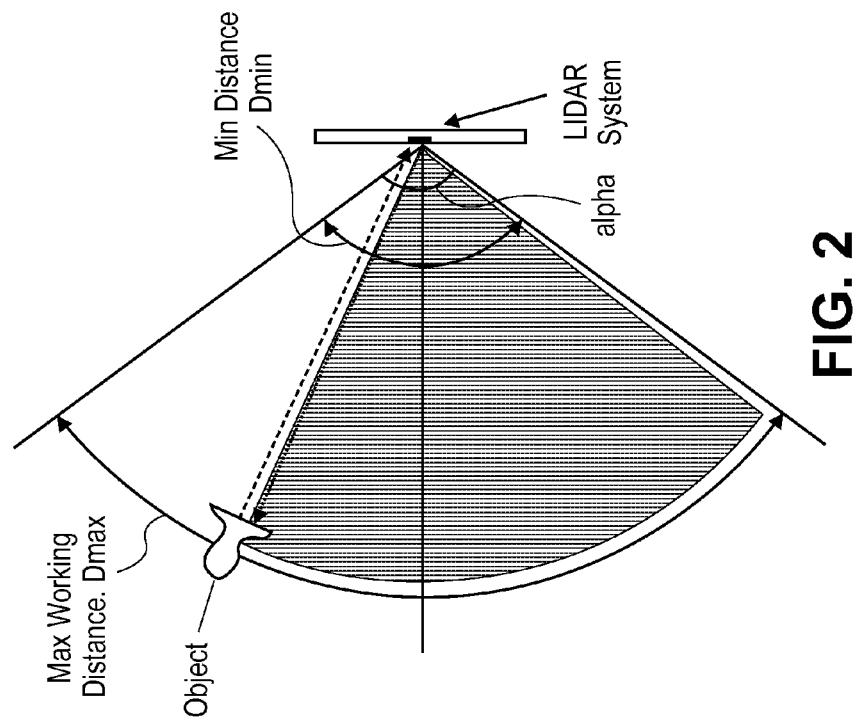
FIG. 1 is a block diagram of a scanning LIDAR system.

Referring to FIG. 1, this is a block diagram of a scanning LIDAR system. The system has a pulse emitter 2, a pulse detector 4, a scanning mirror 6, and an optional fixed mirror 8. The mirrors are positioned in the optical path of the outgoing (drive) and incoming (return or reflected) light pulses as shown. The fixed mirror 8 is optional for some embodiments, depending upon the optical system design and the desired resolution and field of view (FOV). In addition, although not shown, the optical paths of the outgoing and incoming pulses may have additional optical elements inserted therein for various reasons, including filters and polarizers for example that are not shown. The emitter 2 produces a light pulse that makes its way through the optical path as shown and is reflected from an object in the scene, producing a return pulse that is detected by the detector 4. The emitter may contain a coherent collimated light source to produce the drive pulse, e.g. a pulsed laser, which can produce a light beam with sufficiently low divergence so that the beam can spot a point in space. The size of the point or spot may be defined by a desired imaging resolution for the LIDAR system, including its resolution in the x-y plane. The emitter light source may operate in an invisible wavelength band, such as 1,550 nm. Other wavelengths, however, are possible, e.g. 940 nm, and even visible wavelengths (for example in the 600 nm range). However, at shorter wavelengths, the output power of the emitter may need to be reduced, in order to maintain some level of human eye safety, for exposure at a particular distance from the emitter and over a particular time interval of exposure. Doing so may also reduce the signal-to-noise ratio of the detected return signal.

The system has a detector 4 that may also be referred to here as a photo-detector. The detector 4 may contain, for example, one or more photo diode elements. The detector may also contain associated optics such as a filter and a lens, where the lens may serve to focus the incoming light pulses onto an active photo-detector surface. The detector 4 may be co-located with the emitter 2 for more efficient packaging, i.e. either within the same microelectronic integrated circuit (IC) package, or in different IC packages but within the same housing of a larger host device such as a consumer electronics product. The optical system including the detector and the emitter should be designed so that the detector's active surface receives the incoming pulse essentially along the same propagation axis as the outgoing pulse. An optical redirection device may be added in front of the detector, to redirect the incoming pulse so that the detector active surface need not be located immediately adjacent to or abutting the emitter, nor aimed in the same direction as the emitter.

The LIDAR system also has a scanning mirror 6, which is a mirror that is motorized to pivot, rotate or tilt so as to quickly and accurately sweep the outgoing pulses that are reflected by it, so that the light beam pulses sweep the entirety of a desired 2D space. An example is a micro electromechanical system (MEMS) 2-axis scanning mirror that has a single mirror surface that is coupled to a movement mechanism that allows the mirror to pivot about two orthogonal axes. In another embodiment, there may be two separate movable mirror surfaces, each of which is controlled to tilt or rotate about a different axis. The scanning mirror may have a continuously oscillating mirror element, or it may alternatively have a spinning mirror element such as a multi-faceted spinning mirror.

Figure 2:
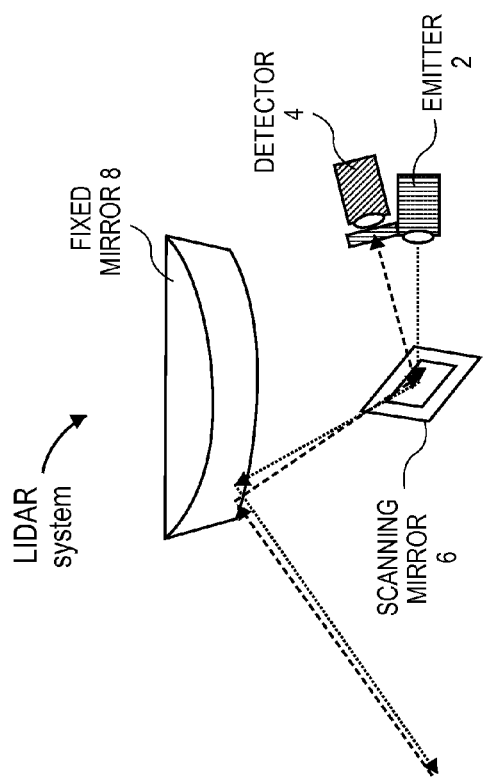
FIG. 2 illustrates how reflected light pulses are captured by a photodetector in the LIDAR system, and illustrates the x-axis FOV.

Referring to FIG. 2, the LIDAR system contains the needed electronics hardware for controlling the detector, emitter, and scanning mirror so as to emit pulses in rapid sequence while at the same time causing the scanner mirror to rotate, pivot or tilt so that the sequence of pulses (or pulse train) scans a desired 2D space generally referred to as an x-y plane, in order to cover the desired FOVs. FIG. 2 depicts the FOV in the x-direction, which may be defined by an angle alpha as shown. In addition to a minimum working radial distance, Dmin, the system also has a maximum working radial distance, Dmax, as measured for example from the emitter 2 or from the detector 4, beyond which an object cannot be properly imaged. The radial distance to the point of reflection of a pulse from an object, also referred to as the distance in the z-direction, is computed by the electronics hardware using a time of flight measurement of an individual pulse. Thus, each point of reflection is to be measured by its respective pulse that has been emitted and reflected (and then detected by the system). The electronics system will produce a data structure, e.g. a 3D depth point cloud, that associates the computed radial distance of a return pulse (after it has been deflected by the scanning mirror and sensed by the detector), with its respective coordinates in a 2D space, generally referred to as x-y coordinates. The x-y coordinates may be derived from angular coordinates of the tilt or rotation angles of the scanning mirror at which the return pulse or its associated drive pulse was deflected. It should be noted that while the description here may refer to the 3D depth point cloud as being given in x-y-z coordinates, or the position of a scanning light beam spot in the x-y plane, the 3D depth point cloud may just as well be given in terms of the angular coordinates of the orientation of the scanning mirror, also referred to as polar coordinates.

Returning to FIG. 1, in this particular embodiment of the LIDAR system, the mirror system also has a fixed mirror that is depicted as a FOV expanding panoramic mirror. The fixed mirror is positioned or located within the optical path of the drive and return pulses as shown. The FOV expanding mirror may be used in situations where the optical system as a whole, including its packaging within a consumer electronic product, needs a greater FOV. The FOV expansion may be needed in situations where the scanning mirror has limitations on how far it can tilt or rotate. More generally, in a situation where the scanning mirror has insufficient sweep, a reflecting FOV expansion device (mirror) or a refracting type of FOV expansion device, such as a lens, could be inserted into the optical path of the pulses, at the expense of some resulting reduction in imaging resolution (for the same rate of pulse emission and detection).

Figure 3:
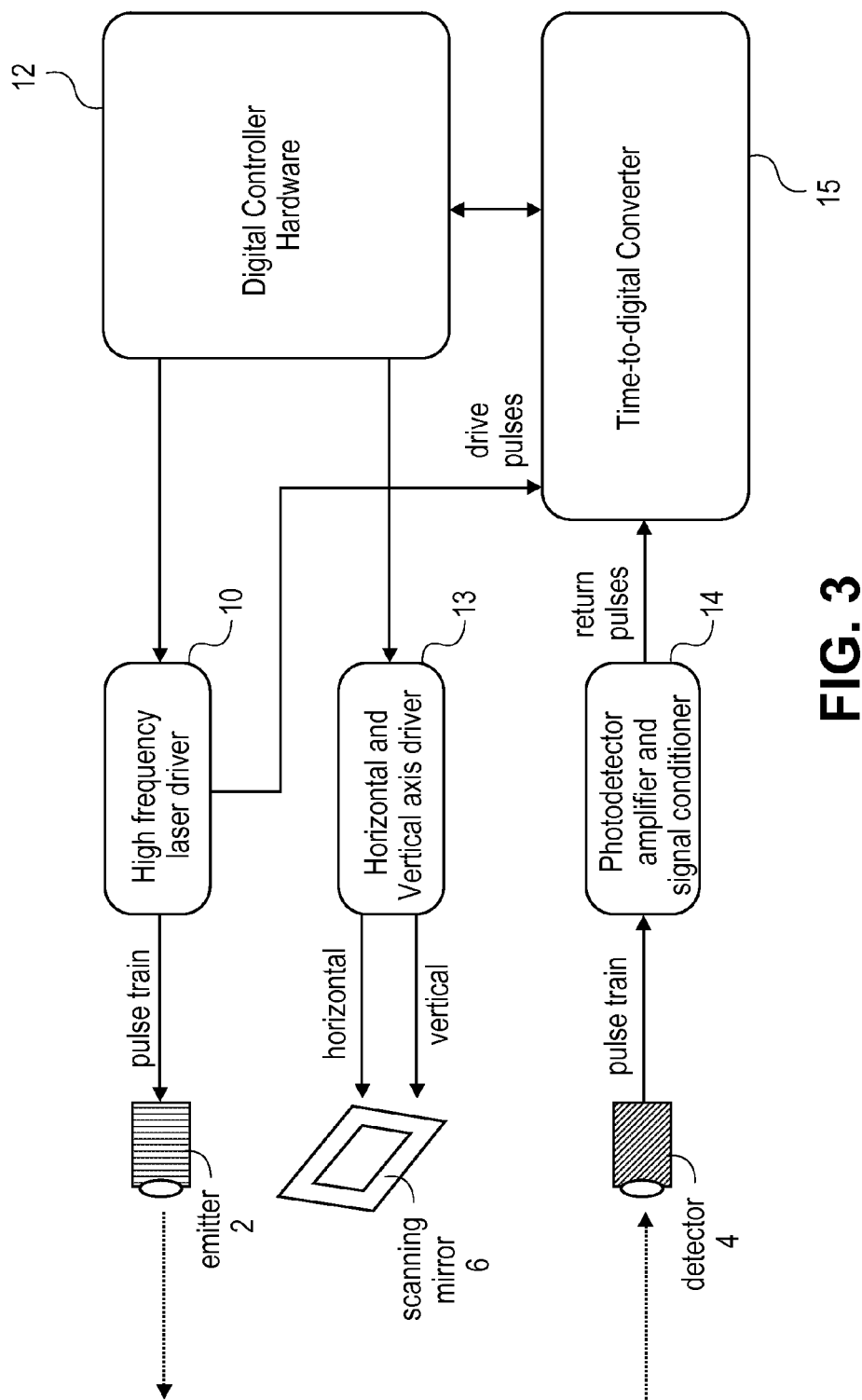
FIG. 3 is a block diagram of electronic components of the LIDAR system and their connections to the optical components with which they interface.

Turning to FIG. 3, a block diagram of electronic components of the LIDAR system and their relationship with the optical components with which they interface is shown. In this embodiment, high-speed electronics circuitry in the form of a high frequency laser driver 10 and associated higher layer control circuitry, as part of a digital controller 12, is provided that can control the light pulses being produced by the emitter 2. At the same time, the sweeping of the scanning mirror 6 is controlled, here using horizontal and vertical axis actuator driver circuitry 13 that is also being monitored and controlled by the higher layer digital controller 12. A signal representing the return pulses is provided by a photo-detector amplifier and signal conditioner circuit 14, based on the incoming light pulses detected by the detector 4. This signal, together with one that represents the drive pulses (the latter may be obtained from the laser driver 10), are then processed by a time-to-digital converter circuit 15 to produce a digital value which is a measure of the time of flight, t, for each pixel (which is associated with a respective pair of outgoing and incoming pulses). The latter may then be used by the digital controller 12, to compute the distance, D, using for example the equation $t=2*D/c$ (see also FIG. 4), where c is the speed of light and D is the distance (along the path of a drive or return beam) between the emitter-detector 2,4 and the reflection point on the object. The scanning mirror 6 continues its back and forth tilting or rotation in order to sweep the entirety of the horizontal and vertical FOVs, while the controller 12 generates the 3D depth map for each frame. This process repeats for the next frame (when the scanning mirror 6 repeats its sweep again).

Figure 4:
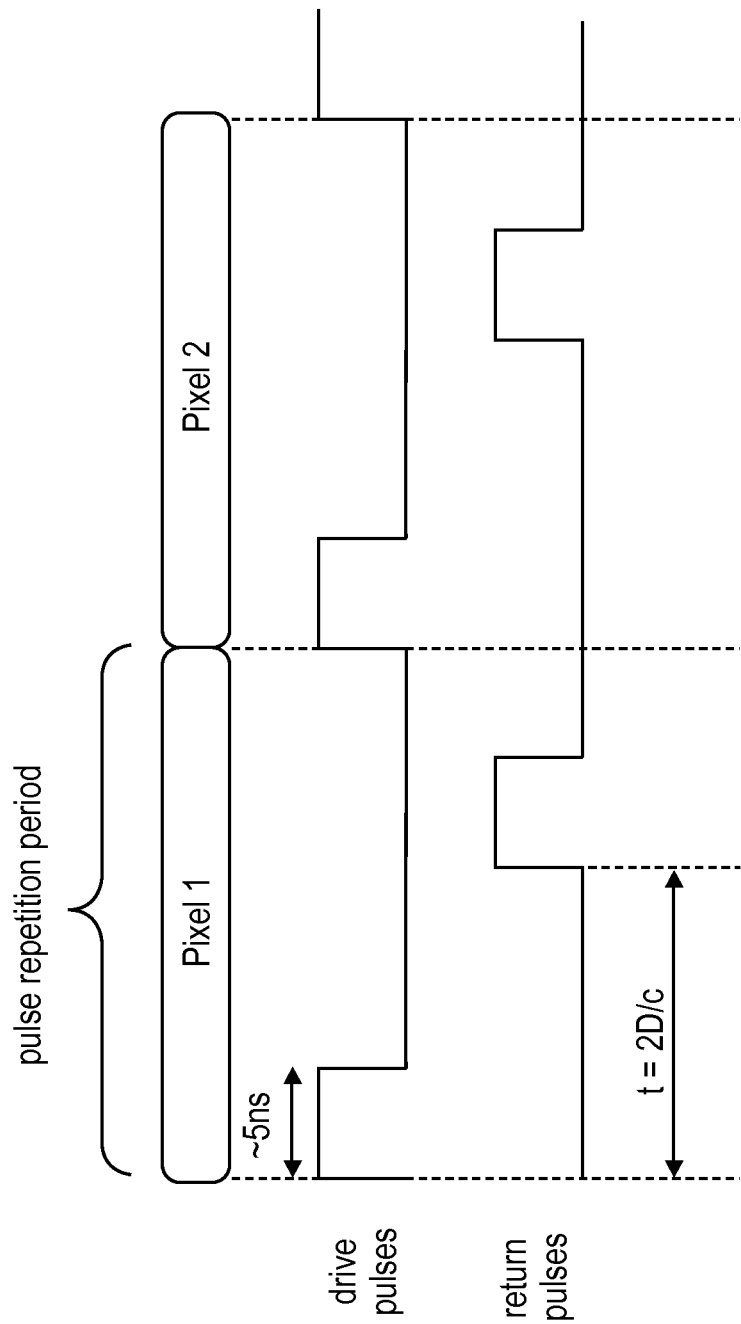
FIG. 4 is timing diagram showing drive pulses and associated return pulses of adjacent pixels produced by the LIDAR system.

Referring to FIG. 4, this figure is a timing diagram showing how two adjacent pixels may be defined by their respective periods in the outgoing or drive pulse signal. The time of flight t may be measured from when an outgoing pulse for a pixel is sent, to when its reflection is detected. Some parameters that need to be specified may include outgoing pulse width, pulse repetition rate or pixel time, and perhaps others. These parameters may be determined based on 1) a desired resolution for the full or 3D FOV of the LIDAR system (e.g., the resolution may be a 3D spot or cube of for example 0.5 cm per side or 1 cm per side), 2) the horizontal and vertical FOVs in terms of angles in the x-direction and y-direction covering the scene, 3) the range of the LIDAR system being a function of the expected maximum distance Dmax and minimum distance Dmin between the emitter-detector 2, 4 and an object in the scene, for example between one to five meters), and 4) the desired frame rate, for example between ten to sixty frames/sec. Such parameters may call for a LIDAR system having a 5 ns pulse width, 22 MHz pulse train or measurement event frequency, horizontal sweep frequency for the scanning mirror of 23 kHz, and vertical sweep frequency of 60 Hz. Note that these numbers are only for one particular example of the LIDAR system, and should be not viewed as limiting any actual implementations of the system covered here.

In one embodiment, there is no need to modulate the outgoing light beam from the emitter with any particular code or information, and a single pulse can be sent in each pixel time period. In another embodiment, the outgoing light beam is modulated with a code or other information, e.g. multiple pulses in each pixel time period, and a detected phase change between the outgoing modulation and the incoming modulation represents the measured time of flight.

In one aspect of the invention, it is recognized that an embodiment of the LIDAR system described here may inherently contain one or both of the following distortion effects. First, in the case where the scanning mirror 6 has an oscillating mirror, the angular velocity of such a mirror is not constant as it sweeps the outgoing beam across the scene. The mirror moves fast at its middle position, and slows down and reverses direction at the ends of its range of motion. In the case of resonant motion, the velocity function takes the form of a sinusoid. This introduces variability in the total time that is available for a pulse of light to propagate into the scene, be reflected back, and then be absorbed by the detector 4. As a result, the maximum range of the system also becomes variable and in particular a function of the tilt angle of the mirror 6.

The above-mentioned variability in the total available flight time also introduces undesirable variability in the lateral resolution of the system, if a constant pulse repetition period (or frequency) is used—see for example FIG. 4. The resolution is low in the center of the field of view (where the mirror is moving fastest) and high at the edges of the field of view (where the mirror is moving slowest).

A second potential distortion effect may be the distortion of the 2D field of view, into one having a pincushion distortion pattern. This may be the result of the scanning mirror 6 being actuated (rotated or tilted) in two axes. This distortion is elongated and is made significantly asymmetric when the emitter 2 (e.g., a laser source) illuminates the scanning mirror 6 at an angle different than ninety degrees relative to the mirror's flat surface, when the mirror is in its un-actuated position. In many applications, a rectangular 2D field of view is required. For such cases, the only usable area of the elongated pincushion shape is described by a rectangle that fits completely within the pincushion. But there are significant engineering tradeoffs involved in increasing the range of motion of the scanning mirror 6. It is highly desirable to efficiently utilize whatever range of motion the mirror 6 has.

In accordance with an embodiment of the invention, a compensation mirror (e.g., the fixed mirror 8) may be inserted into the path of the outgoing beam, the incoming beam, or both, where this mirror is shaped appropriately in order to compensate or correct for both of the above-described forms of distortion. The compensation mirror may have different radii of curvature at its edge and at its center, so as to reduce, if not minimize, both of the distortions described above. In one embodiment, the compensation mirror may have enhanced convex curvature at its edges so as increase the effective velocity of the light beam spot that is being swept (e.g., the scanned laser spot), in regions of the field of view where the scanning mirror 6 is moving most slowly. In a similar vein, adding reduced convex curvature (or even mildly concave curvature) at the center of the compensation mirror can decrease the effective velocity of the scanned laser spot in regions where the scanning mirror 6 is moving fastest. Any one or both of these curvature adjustments may be present in the compensation mirror, as desired to control the effective velocity of the swept light beam. In another embodiment, the compensation mirror may be fully concave, but with less concavity at its edge (relative to its center). This may create a focusing optic that may perform many of the same functions as the flat or convex version mentioned above.

In accordance with another embodiment of the invention, the overall shape of the compensation mirror can be adjusted to reduce or eliminate the pincushion distortion described above (that may caused by the off-axis illumination of the emitter 2). Through suitable computation, an overall shape function can be described that simultaneously causes not only the apparent velocity of the scanned laser spot to be constant, but also reshapes (e.g., into essentially rectangular) the scan pattern of the laser spot.

In one instance, the shape function of the compensation mirror can be computed so as to sufficiently reduce, if not minimize, distortion when the laser spot illuminates a planar surface (such as an object in the scene) that is oriented normal to the projection system, i.e. normal to the propagation axis of the outgoing laser beam, or the optical axis of the emitter 2. Other shapes could be computed for other applications, such as planes that are tilted relative to the projection system.

In another instance, the shape function can be computed so as to sufficiently reduce, if not minimize, distortion when the laser spot is projected onto a non-planar surface in the scene. One example is when the scanned spot is projected onto the inside of a spherical surface, resulting in a constant angular velocity for the scanned spot.

An embodiment of the invention is a method for illuminating and scanning a scene, thereby producing a 3D depth map of objects in the scene. Examples of hardware that can perform the operations of the method are given below in connection with FIG. 1 and FIG. 3 described earlier. A sequence of outgoing pulses of coherent collimated light are produced, which are transmitted in a given (e.g., fixed) direction, e.g. by the emitter 2. The outgoing pulse sequence is then deflected towards a scene, using one or more moving reflective surfaces (e.g., the scanning mirror 6). The moving reflective surfaces are tilted or rotated, while the outgoing pulse sequence is being deflected, so that a light beam spot, that results from the outgoing pulses, scans a two dimensional region in the scene. In other words, a sweeping or scanning light beam spot is produced that in one "frame" time interval will cover the entire scene of interest. A sequence of incoming pulses, being reflections of the outgoing pulses, respectively from an object in the scene, are deflected, towards said given direction, using the moving reflective surfaces. The deflected incoming pulses are then detected (e.g., by the detector 4).

The process continues with a number of radial distances or depths being computed, each based on time of flight between one of the detected, deflected incoming pulses and its respective outgoing pulse (e.g., by the combination of the controller 12 and converter 15). The computed radial distances are then provided as part of a scanned 3D depth map of objects in the scene.

In one embodiment, the deflected sequence of outgoing pulses (from the moving reflective surfaces) are further deflected towards the scene, using a non-moving reflective surface (e.g., fixed mirror 8). In addition, the sequence of incoming pulses arriving from the scene, are deflected towards the moving reflective surfaces, e.g. using the same non-moving reflective surface. The non-moving reflective surface may be a field of view expanding panoramic mirror. In addition, or as an alternative, the non-moving reflective surface may also act as a compensation mirror that has enhanced convex curvature at its edge, and either reduced convex curvature or some concave curvature at its center. This helps compensate for the distortions described above.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although in FIG. 4 the pulse is labeled as having a width of approximately 5 nsec, this was part of the example calculations given above to merely illustrate the more general concepts, and so it should be understood that actual implementations of the system may adopt other pulse widths. Also, while the drive and return beams in FIG. 1 are shown as having an angular offset relative to each other (they are not shown as being parallel or completely aligned with each other), this is an exaggeration for purposes of understanding the concepts here. The description is thus to be regarded as illustrative instead of limiting.

What is claimed is:

1. A light detection and ranging system comprising:
   an emitter which produces an outgoing pulse sequence of coherent collimated light;
   a mirror system having a scanning mirror that is positioned to deflect the outgoing pulse sequence;
   a compensation mirror positioned to further deflect the outgoing pulse sequence after it is deflected by the scanning mirror, the compensation mirror having a surface with a first curvature at an edge of the compensation mirror that is different from a second curvature at a center of the compensation mirror;
   a detector collocated with the emitter and aimed to detect an incoming pulse sequence that is a reflection of the outgoing pulse sequence; and
   electronic circuitry that is coupled to communicate with the emitter and the detector and to control the scanning mirror, so that the outgoing pulse sequence scans a scene and the electronic circuitry computes a radial distance for each pair of outgoing and incoming pulses and uses the computed radial distance to provide a scanned 3D depth map of objects in the scene.

2. The system of claim 1 wherein the compensation mirror comprises a field of view expanding panoramic mirror.

3. The system of claim 1 wherein the scanning mirror is a MEMS 2-axis scanning mirror having a single mirror surface that tilts so that the outgoing pulse sequence covers the scene.

4. The system of claim 1 wherein the emitter comprises a pulsed laser.

5. The system of claim 1 wherein the first curvature is a convex curvature, and the second curvature is either a reduced convex curvature or a concave curvature.

6. The system of claim 1 wherein the first curvature causes an effective increase in an angular velocity of the outgoing pulse sequence after it is deflected by the scanning mirror when the scanning mirror is moving with a low angular velocity.

7. The system of claim 6 wherein the second curvature causes an effective decrease in the angular velocity of the outgoing pulse sequence after it is deflected by the scanning mirror when the scanning mirror is moving with a high angular velocity.

8. The system of claim 1 wherein the first curvature and the second curvature of the compensation mirror together cause 1) an effective increase in an angular velocity of the outgoing pulse sequence after it is deflected by the scanning mirror when the scanning mirror is moving with a low angular velocity, and 2) an effective decrease in the angular velocity of the outgoing pulse sequence after it is deflected by the scanning mirror when the scanning mirror is moving with a high angular velocity.

9. The system of claim 1 wherein the first curvature and the second curvature of the compensation mirror together cause a reduction of pincushion distortion otherwise present in a full sweep pattern of the outgoing pulse sequence after it is deflected by the scanning mirror.

10. The system of claim 1 wherein:
    the emitter illuminates the scanning mirror off-axis when the scanning mirror is in its un-actuated orientation; and
    the compensation mirror is shaped to reduce pincushion distortion created by the angle of emitter illumination.

11. The system of claim 1 wherein an overall shape of the compensation mirror simultaneously 1) changes an angular velocity of the outgoing pulse sequence after it is deflected by the scanning mirror moving with a changing angular velocity to be constant, and 2) reshapes the outgoing pulse sequence after it is deflected by the scanning mirror moving into an essentially rectangular sweep pattern.

12. A method for providing a scanned 3D depth map of objects in a scene, comprising:
    producing an outgoing pulse sequence of coherent collimated light;
    moving one or more reflective surfaces to deflect the outgoing pulse sequence;
    deflecting the outgoing pulse sequence coming from the one or more reflective surfaces towards the scene using a non-moving compensation mirror having a surface with a first curvature at an edge of the compensation mirror that is different from a second curvature at a center of the compensation mirror; and
    detecting an incoming pulse sequence that is a reflection of the outgoing pulse sequence;
    computing a plurality of radial distances based on time of flight between each of a plurality of outgoing pulses and corresponding incoming pulses;
    providing the computed plurality of radial distances as part of a scanned 3D depth map of objects in the scene.

13. The method of claim 12 wherein the compensation mirror is a field of view expanding panoramic mirror.

14. The method of claim 12 wherein the first curvature is a convex curvature, and the second curvature is either a reduced convex curvature or a concave curvature.

15. The method of claim 12 wherein the first curvature causes an effective increase in an angular velocity of the outgoing pulse sequence after it is deflected by the one or more reflective surfaces when the one or more reflective surfaces are moving with a low angular velocity.

16. The method of claim 15 wherein the second curvature causes an effective decrease in the angular velocity of the outgoing pulse sequence after it is deflected by the one or more reflective surfaces when the one or more reflective surfaces are moving with a high angular velocity.

17. The method of claim 12 wherein the first curvature and the second curvature of the compensation mirror together cause an effective increase in an angular velocity of the outgoing pulse sequence after it is deflected by the one or more reflective surfaces when the one or more reflective surfaces are moving with a low angular velocity, and cause an effective decrease in the angular velocity of the outgoing pulse sequence after it is deflected by the one or more reflective surfaces when the one or more reflective surfaces are moving with a high angular velocity.

18. The method of claim 12 wherein the first curvature and the second curvature of the compensation mirror together cause a reduction of pincushion distortion otherwise present in a full sweep pattern of the outgoing pulse sequence after it is deflected by the one or more reflective surfaces.

19. The method of claim 12 wherein:
an emitter illuminates the one or more reflective surfaces off-axis at an angle of emitter illumination when the one or more reflective surfaces are in their un-actuated orientations; and
the compensation mirror is shaped to reduce pincushion distortion created by the angle of emitter illumination.

20. The method of claim 12 wherein an overall shape of the compensation mirror simultaneously changes an angular velocity of the outgoing pulse sequence to be constant after the outgoing pulse sequence is deflected by the one or more reflective surfaces moving with a changing angular velocity, and reshapes the outgoing pulse sequence into an essentially rectangular sweep pattern after it is deflected by the one or more reflective surfaces.

* * * * *